(No Model.)
F. W. COLLINS.
NUT LOCK.
No. 423,738. Patented Mar. 18, 1890.
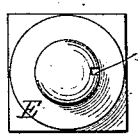
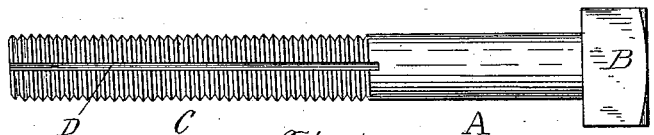
Fig. 2. Fig. 1.
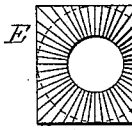
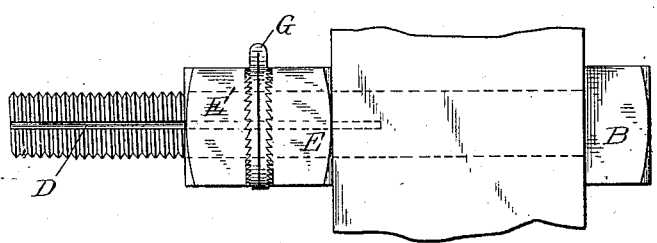
Fig. 4. Fig. 3.
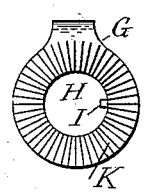 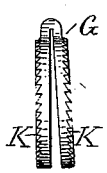 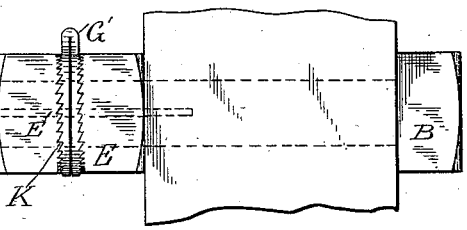
Fig. 6. Fig. 7. Fig. 8.
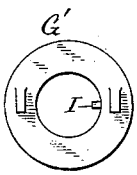  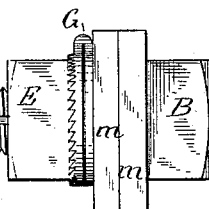
Fig. 10. Fig. 9. Fig. 5.
Witnesses:
L. M. Bartlett
T. W. Johnson
Inventor:
Frank W. Collins
By W. H. Bartlett
Attorney

UNITED STATES PATENT OFFICE.

FRANK W. COLLINS, OF CORTLAND, NEW YORK.

NUT-LOCK.

SPECIFICATION forming part of Letters Patent No. 423,738, dated March 18, 1890.

Application filed December 28, 1889. Serial No. 335,205. (No model.)

*To all whom it may concern:*

Be it known that I, FRANK W. COLLINS, residing at Cortland, in the county of Cortland and State of New York, have invented certain new and useful Improvements in Nut-Locks, of which the following is a specification, reference being had therein to the accompanying drawings.

This invention relates to nut-locks for use on bolts or machine-screws.

The object of the invention is to produce a washer which will have a locking engagement with the nut on the bolt and a tongue engagement with the bolt or machine-screw.

Figure 1 is a side elevation of a screw-bolt having a longitudinal groove. Fig. 2 is an end view of a nut. Fig. 3 is an elevation of a grooved screw-bolt with double nut and locking-washer. Fig. 4 is a face view of the nut having radial ridges. Fig. 5 is a side view of bolt with plates or washers to be fastened and locking-washer. Fig. 6 is a face view, and Fig. 7 an edge view, of locking-washer. Fig. 8 is a side view of bolt, double nut to lock loosely, and washer. Fig. 9 is an edge view, and Fig. 10 a face view, of modified washer.

A indicates a screw-bolt or machine-screw, having head B, threaded portion C, and longitudinal groove D in the threaded portion.

E indicates a threaded nut to fit the bolt and being of usual construction, except for a series of radial ribs F on one face of said nut. These ribs may have their inclined faces in one direction and faces perpendicular to the plane-face of the nut at the other side like ratchet-teeth.

G indicates a washer having a central opening H of about the diameter of bolt A, and having a nib or teat I extending inward, of such size as to rest in groove D when the washer is applied to the bolt, and so prevent the turning of the washer on the bolt. The washer G is doubled back on itself, as shown in Figs. 3, 5, 7, and 8, and one or both the outer faces of the two leaves have ribbed or ridged faces, the ribs or ridges being radial and the counterparts of the ribs F on the nut. If the ribs are in the nature of ratchet-teeth, they are faced in reverse direction from the ribs or teeth on the nut. As shown in Fig. 7, the two ribs of the washer G have a tendency to spring apart.

Fig. 3 shows the washer G as ribbed on one face and applied to the bolt to hold the plates M M in place. The flat face of the washer rests against one of the plates M. The ribbed face K is toward the ribbed face of nut E and the ratchet-teeth on the nut and washer face in opposite directions. The nib I rests in groove D and prevents the washer from turning on the bolt. When the nut E is set up close, the ribs on the nut and washer interlock, and the nut cannot be turned back except by a breakage of parts.

Fig. 8 shows nut E, with a ribbed or ratchet face, applied to the bolt and a washer G, with a ratchet-face, interlocking therewith. The reverse face of the washer has teeth in reverse direction, and this face is engaged by the nut E'. The two nuts and washer are thus firmly locked together, and can be only turned back or unlocked by the exertion of force great enough to break the nib I from the washer.

It is sometimes desirable to lock a double nut when it is not very closely set home on the bolt. This may be done by such a construction as is indicated in Fig. 3, in which the ratchet or ribbed face of the washer G engages nut E when the nut is not set too closely home, and nut E' is afterward turned on. By turning up or tightening the nut E the washer G may be loosened, when nut E' can be turned back and afterward the washer removed.

Figs. 9 and 10 illustrate a modification, in which G' is a washer of a single leaf, but having spring-tongues K' struck up or cut through the metal on opposite sides. These spring-tongues answer in lieu of the ribs K on the spring-leaves of the folded or doubled washer G and interlock with the ribs F of the nuts E or E' when the washer is applied to the bolt. This washer by its spring engagement with the face of the nut or nuts enables the nut to be screwed to any position on the bolt at which the washer can find the bearing, either against a nut, as E, or a bar, washer, or bearing M.

What I claim is—

1. The combination, with the grooved bolt, of a double spring-washer, said washer having a nib extending into the groove of the bolt and having teeth projecting from one face, and a nut having serrations on its face engaging the teeth of the washer, substantially as described.

2. The combination, with the grooved bolt, of a double spring-washer having projections from both faces and a nib extending into the groove of the bolt and a nut at each side of the washer, having ribs on the face engaging the projections on the washer, substantially as described.

In testimony whereof I affix my signature in presence of two witnesses.

FRANK W. COLLINS.

Witnesses:
A. A. SPRAGUE,
C. E. THOMPSON.